(12) United States Patent
Matsumoto et al.

(10) Patent No.: US 12,413,850 B2
(45) Date of Patent: Sep. 9, 2025

(54) GENERATING AND USING A MODEL FOR SETTINGS IN AN IMAGING APPARATUS

(71) Applicant: CANON KABUSHIKI KAISHA, Tokyo (JP)

(72) Inventors: Shogo Matsumoto, Kanagawa (JP); Pucheng Liu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 18/295,505

(22) Filed: Apr. 4, 2023

(65) Prior Publication Data

US 2023/0345116 A1 Oct. 26, 2023

(30) Foreign Application Priority Data

Apr. 20, 2022 (JP) ................................. 2022-069479

(51) Int. Cl.
*H04N 23/60* (2023.01)
*H04N 23/61* (2023.01)

(52) U.S. Cl.
CPC ............. *H04N 23/64* (2023.01); *H04N 23/61* (2023.01)

(58) Field of Classification Search
CPC ........ H04N 23/64; H04N 23/61; H04N 23/67; H04N 23/676; H04N 23/675; G06T 5/60; G06T 5/73; G06T 2207/10148; G06T 2207/20084; G06T 2207/20221; G06T 5/50; G06T 7/55; G06T 2207/20081; G06T 2207/20228; G06N 3/04; G06N 3/084; G06N 3/096; G06V 10/14; G06V 10/82

USPC ....................................................... 348/222.1
See application file for complete search history.

(56) References Cited

U.S. PATENT DOCUMENTS

| | | | |
|---|---|---|---|
| 2009/0022403 A1* | 1/2009 | Takamori | H04N 19/132 382/195 |
| 2010/0123782 A1* | 5/2010 | Yata | H04N 23/635 348/169 |
| 2010/0220194 A1* | 9/2010 | Ishiko | H04N 21/2187 348/169 |
| 2013/0069978 A1* | 3/2013 | Tanaka | G06V 40/10 382/110 |
| 2014/0009572 A1* | 1/2014 | Matsumoto | H04N 23/743 348/36 |
| 2014/0253760 A1* | 9/2014 | Watanabe | H04N 23/632 348/222.1 |
| 2015/0009352 A1* | 1/2015 | Shibagami | H04N 23/741 348/218.1 |

(Continued)

FOREIGN PATENT DOCUMENTS

JP 2015216532 A 12/2015
WO 2020/118093 A1 6/2020

*Primary Examiner* — Usman A Khan
(74) *Attorney, Agent, or Firm* — Canon U.S.A., Inc., IP Division

(57) ABSTRACT

A learning apparatus includes a model generating unit configured to generate, by using teacher data including a subject and a composite image generated from a plurality of images captured based on settings predetermined for the subject, a model for generating imaging settings suitable for generating a composite image of the subject through machine learning. The plurality of images are images captured at in-focus positions different in an optical axis direction. The settings include at least the in-focus positions. The composite image is an image generated by extracting in-focus regions from the plurality of images.

23 Claims, 17 Drawing Sheets

(56) References Cited

U.S. PATENT DOCUMENTS

| | | | |
|---|---|---|---|
| 2019/0289360 A1* | 9/2019 | Choi | H04N 21/44 |
| 2020/0252545 A1* | 8/2020 | Park | G06N 3/045 |
| 2021/0243377 A1* | 8/2021 | Sasaki | H04N 23/635 |
| 2022/0019851 A1* | 1/2022 | Kawachi | H04N 23/635 |

* cited by examiner

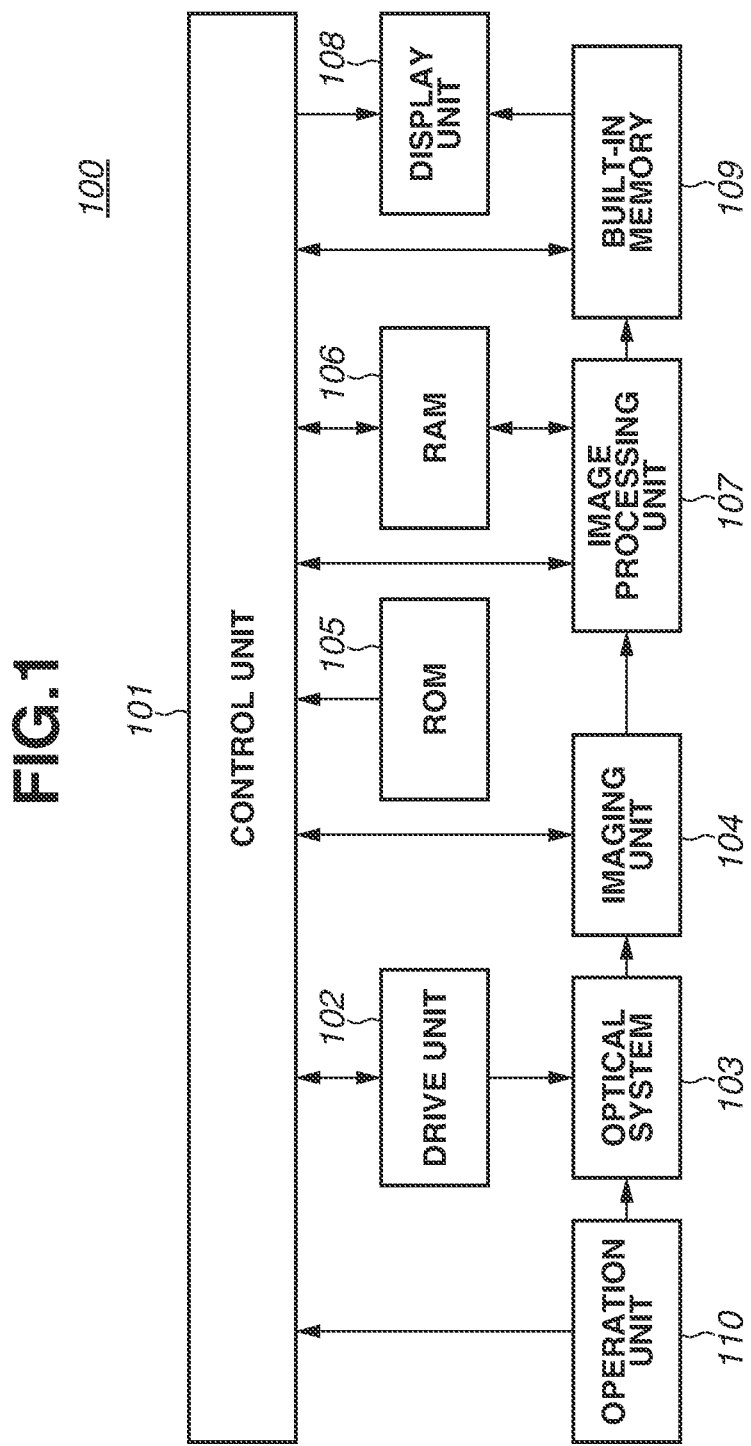

| CAMERA MODEL | AAAAA EOS R5 |
| --- | --- |
| LENS | RF24-105 mm F4 L IS USM |
| NUMBER OF IMAGES | 1000 |
| FOCUS INTERVAL | 0.1 mm |
| BRACKET RANGE | 100 mm |

GENERATING AND USING A MODEL FOR SETTINGS IN AN IMAGING APPARATUS

BACKGROUND OF THE INVENTION

Field of the Invention

The present invention relates to a learning apparatus, and more particularly to a learning apparatus that learns in-focus position settings.

Description of the Related Art

In capturing images of a plurality of subjects existing at largely different distances from a digital camera or in capturing an image of a subject that extends in the depth direction, only a part of the subject may be focused because of an insufficient depth of field. Japanese Patent Application Laid-Open No. 2015-216532 discusses what is called a depth composition technique to solve this problem. The depth composition technique captures a plurality of images with different in-focus positions, extracts in-focus regions from each of the images, and combines the in-focus regions into one image to generate a composite image where the entire imaging region is in focus.

In image capturing intended for the depth composition, a large number of images are captured to obtain a composite image having a sufficient perceived resolution. Since increasing the number of captured images increases the processing load, it can be technically difficult to increase the number of images without limitation.

Conventionally, in capturing an image of a subject by using the depth composition technique, the number of images to be captured is suitably set according to the feature of the subject based on the experiences of a photographer. However, this method is not convenient for an inexperienced photographer because he or she needs to make trials and errors until optimum imaging settings are obtained.

SUMMARY OF THE INVENTION

According to an aspect of the present invention, a learning apparatus includes a model generating unit configured to generate, by using teacher data including a subject and a composite image generated from a plurality of images captured based on settings predetermined for the subject, a model for generating imaging settings suitable for generating a composite image of the subject through machine learning. The plurality of images are images captured at in-focus positions different in an optical axis direction. The settings include at least the in-focus positions. The composite image is an image generated by extracting in-focus regions from the plurality of images.

Further features of the present invention will become apparent from the following description of embodiments with reference to the attached drawings.

BRIEF DESCRIPTION OF THE DRAWINGS

FIG. 1 is a block diagram illustrating a configuration of a digital camera according to an embodiment of the present invention.

DESCRIPTION OF THE EMBODIMENTS

Figure 2A:
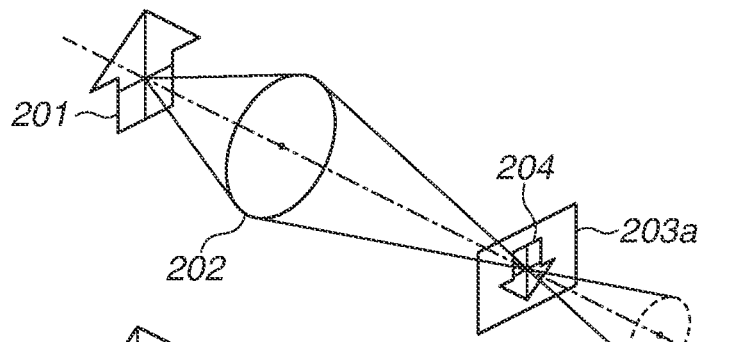
FIGS. 2A to 2D illustrate states where a subject image is formed on an image forming plane according to an embodiment of the present invention.

A preferred embodiment of the present invention will be described in detail below with reference to the accompanying drawings. The present embodiment will be described below centering on an imaging apparatus that makes settings for the depth composition on images captured by a digital camera, by using a learning model generated based on predetermined settings and a composite image generated according to the settings. However, the present invention is not limited to the following embodiment and can be subjected to diverse modifications. For example, an imaging apparatus according to the present invention can be applied not only to digital cameras and digital video cameras, but also to web cameras, network cameras, smart phones including a camera, tablet computers including a camera, and game machines including a camera, and other apparatuses.

<Overview of Digital Camera>

FIG. 1 is a block diagram illustrating an example of a configuration of an imaging apparatus, such as a digital camera for capturing images according to the present embodiment. A digital camera 100 captures a still image, records in-focus position information, calculates a contrast value, and performs image composition. Further, the digital camera 100 can subject an image captured or stored or an image input from the outside to enlargement or reduction processing.

A control unit 101 is a signal processor, such as a central processing unit (CPU) and micro processing unit (MPU). The control unit 101 controls each portion of the digital camera 100 while reading a program stored in a read only memory (ROM) 105 (described below). For example, as described below, the control unit 101 issues an imaging start and an imaging end instructions to an imaging unit 104

(described below). The control unit 101 also issues an image processing instruction to an image processing unit 107 (described below) based on a program stored in the ROM 105. A user instruction is input to the digital camera 100 by an operation unit 110 (described below). The user instruction reaches each portion of the digital camera 100 via the control unit 101.

A drive unit 102 including a motor mechanically operates an optical system 103 (described below) based on an instruction from the control unit 101. For example, the drive unit 102 moves the position of the focusing lens included in the optical system 103 based on an instruction of the control unit 101, to adjust the focal distance of the optical system 103.

The optical system 103 includes a zoom lens, a focusing lens, and a diaphragm. The diaphragm is a mechanism for adjusting the amount of transmitted light. Changing the lens position enables changing the in-focus position.

The imaging unit 104 serving as a photoelectric conversion element performs photoelectric conversion to convert an incident optical signal into an electric signal. For example, a charge coupled device (CCD) sensor or a complementary metal oxide semiconductor (CMOS) sensor is applicable to the imaging unit 104. The imaging unit 104 having a moving image capture mode can capture a plurality of temporally continuing images as different frames of a moving image.

The ROM 105, a nonvolatile read only memory as a recording medium, stores operation programs for different blocks included in the digital camera 100 and parameters used for operations of these blocks. A RAM 106, a rewritable volatile memory, is used as a temporary storage area for storing data output during operations of different blocks included in the digital camera 100.

The image processing unit 107 subjects an image output from the imaging unit 104 or image signal data recorded in a built-in memory 109 (described below) to various image processing, such as white balance adjustment, color interpolation, and filtering. The image processing unit 107 also subjects image signal data captured by the imaging unit 104 to compression processing conforming to the Joint Photographic Experts Group (JPEG) standard.

The image processing unit 107 includes an application specific integrated circuit (ASIC) that integrates circuits for performing specific processing. Alternatively, the control unit 101 can perform a part or whole of the functions of the image processing unit 107 by performing processing according to a program read from the ROM 105 by the control unit 101. When the control unit 101 also performs all of the functions of the image processing unit 107, the image processing unit 107 does not need to be provided as a hardware component.

A display unit 108 is a liquid crystal display (LCD) or an organic electroluminescence (EL) display for displaying, for example, images temporarily stored in the RAM 106, images stored in the built-in memory 109 (described below), and setting screens of the digital camera 100.

The built-in memory 109 is a location for recording, for example, images captured by the imaging unit 104, images processed by the image processing unit 107, and information about the in-focus position at the time of image capturing. A memory card can also be used instead of the built-in memory 109.

Examples of the operation unit 110 include buttons, switches, keys, mode dials provided on the digital camera 100, and a touch panel included in the display unit 108. A user instruction is transferred to the control unit 101 via the operation unit 110.

<Overview of Depth Composition>

Depth composition will now be briefly described.

FIGS. 2A to 2D illustrate states where a subject image is formed on the image forming plane according to the present embodiment.

FIG. 2A illustrates a state where an optical lens 202 forms an image of a subject 201 as an image 204 on a plane 203a. In other words, when the plane 203a coincides with the imaging sensor surface of the imaging unit 104, the image of the subject 201 is focused as a "point" on the plane 203a and is recorded as an in-focus image.

Figure 2B:
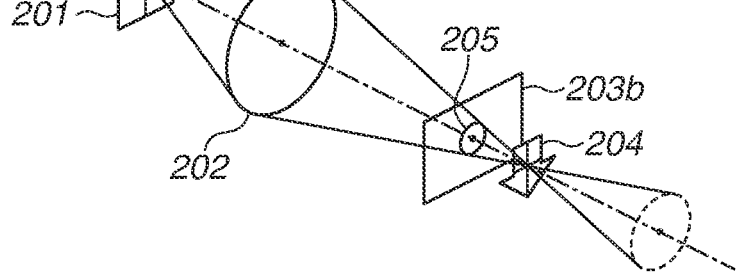

FIG. 2B illustrates a case where the image forming plane does not coincide with the imaging sensor surface. When an imaging sensor surface 203b is positioned at a position different from the position of the plane 203a illustrated in FIG. 2A, the image of the subject 201 focused by the optical lens 202 appears as a circle of confusion 205 on the imaging sensor surface 203b. In the situation illustrated in FIG. 2B, when the circle of confusion 205 is smaller than the permissible circle of confusion of the imaging sensor, the circle of confusion 205 can be equivalently recognized as a "point" in focus, and hence an image equivalent to an in-focus image is obtained. In contrast, when the circle of confusion 205 is larger than the permissible circle of confusion, a defocused image is obtained on the imaging sensor surface 203b.

Figure 2C:
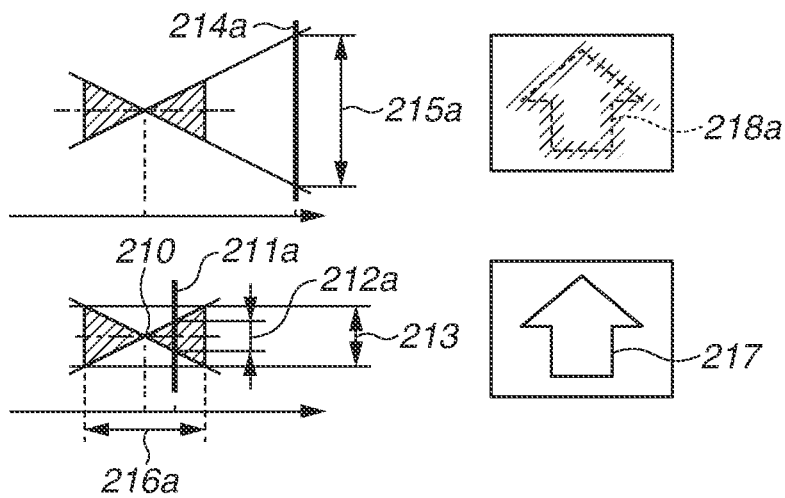

FIG. 2C illustrates the above-described states viewed from a lateral side. When a subject image is focused at a focal point 210 and the imaging sensor surface exists at the position of the plane 211a, a circle-of-confusion diameter 212a is obtained. The circle-of-confusion diameter 212a illustrated in FIG. 2C is smaller than a permissible circle-of-confusion diameter 213 of the imaging sensor. Thus, an image 217 to be recorded by the imaging sensor becomes an in-focus image without defocused state.

In contrast, when the imaging sensor surface exists at the position of an imaging sensor surface 214a, a circle-of-confusion diameter 215a is larger than the permissible circle-of-confusion diameter 213. Thus, an image 218a on the imaging sensor surface 214a becomes a defocused image. The shaded region where the circle-of-confusion diameter 212a is smaller than the permissible circle-of-confusion diameter 213 indicates a focal depth 216a. The focal depth 216a converted to the value on the subject side is referred to as the depth of field.

Figure 2D:
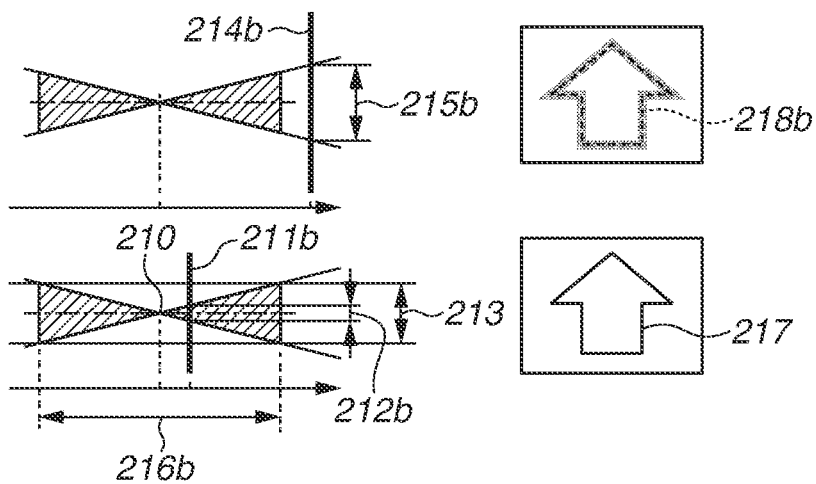

FIG. 2D illustrates a state where the diaphragm is more closed in comparison with that in FIG. 2C. In a state where the diaphragm is closed, the diameter of incident light depends on the difference in depth. Thus, in this state, the circle-of-confusion diameter changes to the circle-of-confusion diameter 212b with respect to the plane 211b, and the circle-of-confusion diameter 215b with respect to the plane 214b. The size of the circle-of-confusion diameter 215b in FIG. 2D is smaller than the size of the circle-of-confusion diameter 215a in FIG. 2C. Thus, an image 218b illustrated in FIG. 2D has less out-of-focus amount than that the image 218a does. The depth of a focal depth 216b illustrated in FIG. 2D is larger than that of the focal depth 216a in FIG. 2C.

Figure 3:
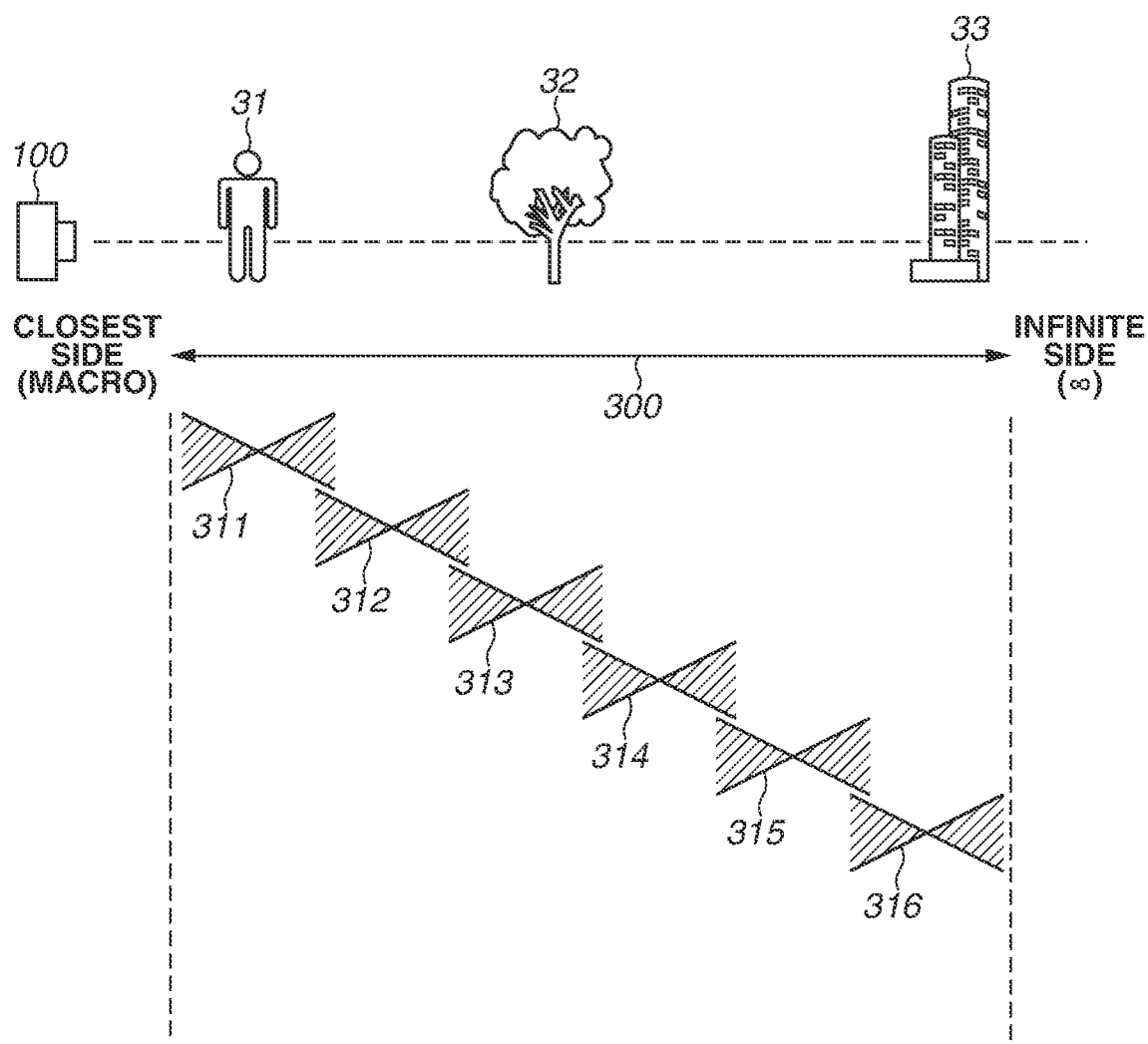
FIG. 3 illustrates image capturing for the depth composition according to an embodiment of the present invention.

FIG. 3 illustrates image capturing for the depth composition according to the present embodiment. Subjects 31 to 33 are assumed as subjects to be focused. The subjects 31 to 33 exist at different distances (subject distances), i.e., the subjects 31, 32, and 33 are positioned closer to the digital camera 100 (in the direction from the short-distance side to the long-distance side) in this order. To obtain a depth composite image with all of the plurality of subjects 31 to 33 in focus, a focal point range 300 (bracket range) subjected to focus bracket image capturing needs to cover a plurality of focal depths. Depths of fields 311 to 316 indicate the focal depths in image capturing at different positions in an optical axis direction, and are arranged to cover the focal point range 300. More specifically, each of the subjects 31 to 33 within the focal point range 300 is in focus in any one of images obtained by performing image capturing (six times) at different in-focus positions corresponding to the depth of fields 311 to 316. In addition, by subjecting the regions in the focal depths in different image capturing to the image composition based on the plurality of images captured in this way, an in-focus image can be obtained over the entire focal point range 300 (entire bracket range).

Although FIG. 3 illustrates an example using the depth composition technique, the present invention is not limited thereto. Another applicable scene where the depth composition technique is used is image capturing intended to obtain an image with a high perceived resolution.

Figure 4:
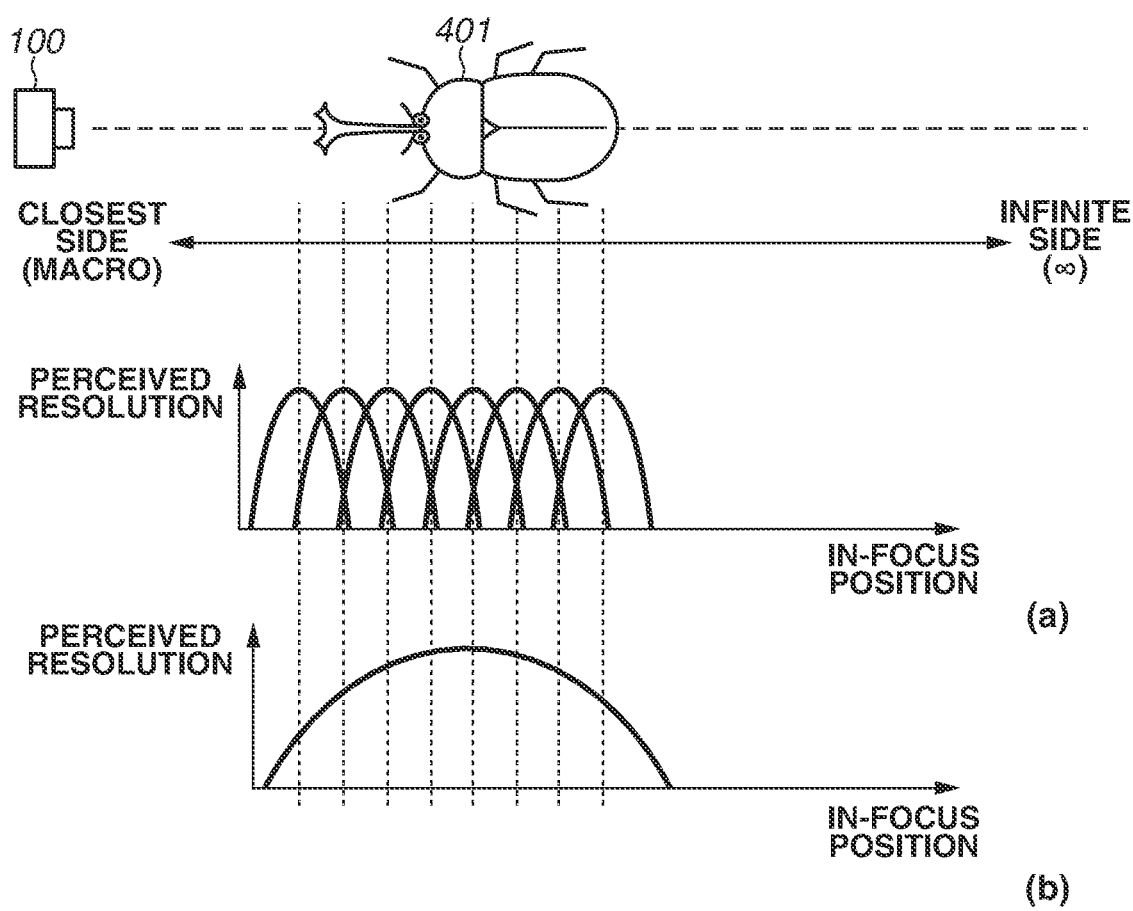
FIG. 4 illustrates perceived resolutions in the depth composition according to an embodiment of the present invention.

FIG. 4 illustrates perceived resolutions in the depth composition according to the present embodiment. Figs. (a) and (b) in FIG. 4 illustrate states where the digital camera 100 captures images of an insect as a subject. Referring to each of the charts illustrated in Figs. (a) and (b) in FIG. 4, the horizontal line indicates the distance from the digital camera 100 in the optical axis direction. The vertical dotted lines drawn at equal intervals indicate in-focus positions during image capturing. Fig. (a) illustrates image capturing performed a plurality of times (i.e., image capturing for the depth composition). Fig. (b) illustrates single image capturing. These charts illustrate states of perceived resolutions having each in-focus position as a peak.

When the subject illustrated in FIG. 4 is an insect, the subject length in the depth direction (optical axis direction) is relatively short, and a problem that the entire focal point range cannot be covered by one image like FIG. 3 is assumed to hardly occur. However, the comparison between Figs. (a) and (b) in FIG. 4 demonstrates that the composite image obtained through the depth composition can maintain a higher perceived resolution than the image obtained by the single image capturing, especially at positions apart from the in-focus position of the single image capturing.

The use of the depth composition technique enables obtaining a high perceived resolution as well as a deep depth of field. For example, in the organism morphology field, the acquisition of images with an extremely high perceived resolution is required to research the structures of insects. The depth composition technique is useful in such fields.

<Processing Flow of Depth Composition>

A processing flow for generating a depth composition image according to the present embodiment will now be described.

Figure 5:
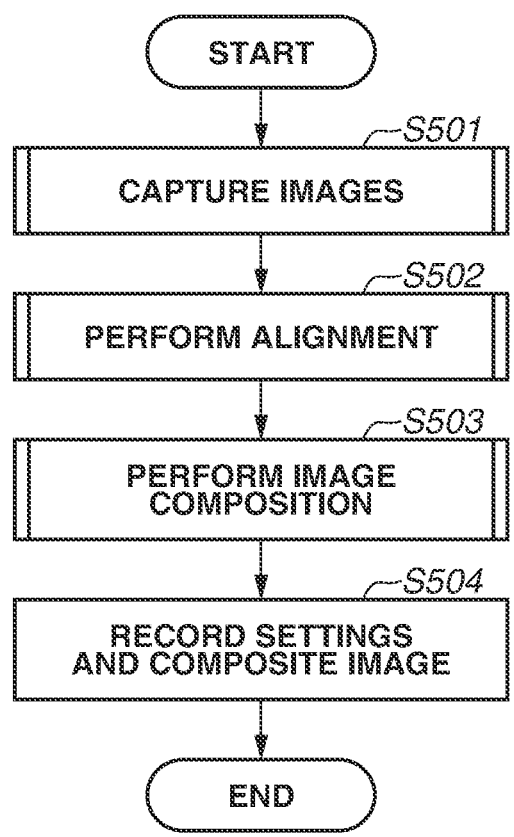
FIG. 5 is a flowchart illustrating composite image generation according to an embodiment of the present invention.

FIG. 5 is a flowchart illustrating composite image generation according to the present embodiment. In step S501, the imaging unit 104 captures a plurality of images with different in-focus positions. In step S502, the control unit 101 performs alignment on the plurality of images captured by the imaging unit 104 in step S501. In step S503, the image processing unit 107 subjects the images after the alignment to the image composition to generate a composite image with a deeper depth of field. For example, the image processing unit 107 (or the control unit 101 performing processing according to a program read from ROM 105) operates as composition means for performing composition processing on the captured images to generate a composite image. In step S504, the control unit 101 records the composite image generated in step S503 in the built-in memory 109, in association with imaging settings in step S601 (described below).

Each step of the flowchart illustrated in FIG. 5 will now be described in detail.

Figure 6:
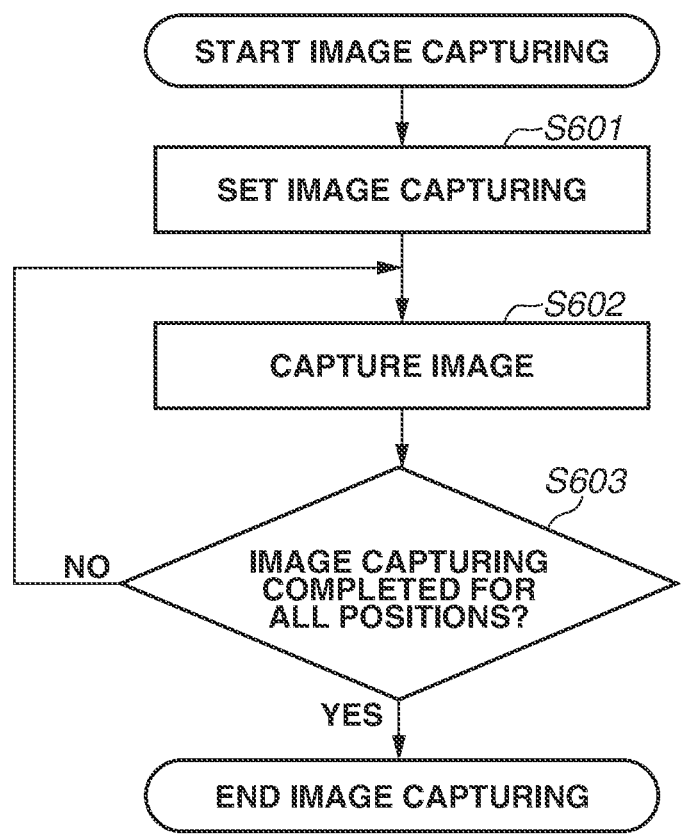
FIG. 6 is a flowchart illustrating image capturing in step S501 according to an embodiment of the present invention.

FIG. 6 is a flowchart illustrating the image capturing in step S501 according to the present embodiment.

In step S601, the control unit 101 sets image capturing. The user sets the optimum number of images to be captured and in-focus positions based on the user's own photographing experiences according to the type of the subject.

In step S602, the imaging unit 104 performs image capturing at the in-focus position with the first order of image capturing where the image capturing is not completed, out of the in-focus positions set in step S601.

In step S603, the control unit 101 determines whether the image capturing is completed at all of the in-focus positions set in step S601. When image capturing is completed at all of the in-focus positions (YES in step S603), the processing illustrated in FIG. 6 ends. When the image capturing is not completed at any in-focus position (NO in step S603), the processing returns to step S602.

With a multi-lens camera having a plurality of imaging units 104, the control unit 101 can simultaneously perform the image capturing at the plurality of in-focus positions set in step S601.

Figure 7:
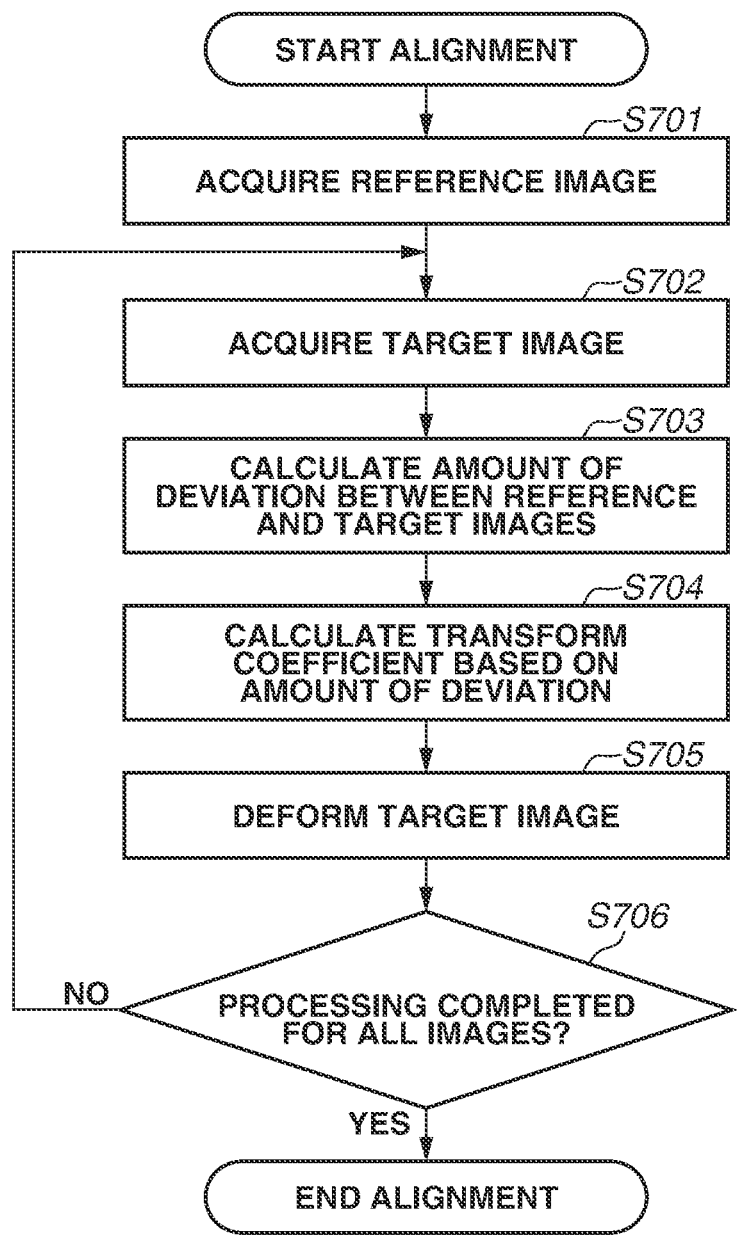
FIG. 7 is a flowchart illustrating alignment in step S502 according to an embodiment of the present invention.

FIG. 7 is a flowchart illustrating the alignment in step S502 according to the present embodiment.

In step S701, the control unit 101 acquires a reference image for the alignment from among the images captured by the imaging unit 104 in step S501. The reference image for the alignment is to be, for example, the image having the first order of image capturing. Alternatively, the reference image can be the image having the smallest angle of field out of the captured images. This is because the angle of field slightly changes between the captured images when image capturing is performed while varying the in-focus position.

In step S702, the control unit 101 acquires the image to be subjected to the alignment processing (target image). The target image is an image other than the reference image acquired in step S701, not having been subjected to the alignment processing. When the image having the first order of image capturing is to be the reference image, the control unit 101 can acquire the target image in order of image capturing.

In step S703, the control unit 101 calculates the positional deviation between the reference image and the target image. An example of a calculation method will now be described. The control unit 101 sets a plurality of blocks to the reference image. It is preferable that the control unit 101 sets the blocks such that they have the same size. The control unit 101 then sets a search range to a range wider than each block of the reference image at the same position in the target image as the position of each block of the reference image. Finally, the control unit 101 calculates a corresponding point in each of the search ranges of the target image, where sum of absolute difference (hereinafter referred to as SAD) in luminance from each block of the reference image is minimized. The control unit 101 calculates the positional deviation calculated in step S703 as a vector, based on the center of each block of the reference image and the above-described corresponding point. In the calculation of the above-described corresponding point, the control unit 101 can use sum of squared difference (hereinafter referred to as SSD) or normalized cross correlation (hereinafter referred to as NCC) in addition to SAD.

In step S704, the control unit 101 calculates the transform coefficient based on the amount of positional deviation between the reference image and the target image. The control unit 101 uses, for example, a projection transform coefficient as the transform coefficient. However, the transform coefficient is not limited to the projection transform coefficient. The affine transform coefficient or a simplified transform coefficient only with the horizontal and vertical shifts is also applicable.

In step S705, the image processing unit 107 converts the target image by using the transform coefficient calculated in step S704.

For example, the control unit 101 can perform the transform by using Formula (1).

$$I' = \begin{pmatrix} x' \\ y' \\ 1 \end{pmatrix} = AI = \begin{pmatrix} a & b & c \\ d & e & f \\ g & h & i \end{pmatrix} \begin{pmatrix} x \\ y \\ 1 \end{pmatrix}. \tag{1}$$

In Formula (1), (x',y') denotes the coordinates after the transform, and (x,y) denotes the coordinates before the transform. A matrix A represents the transform coefficient calculated by the control unit 101 in step S704.

In step S706, the control unit 101 determines whether the alignment is completed for all images other than the reference image. When the alignment is completed for all images other than the reference image (YES in step S706), the processing of the flowchart illustrated in FIG. 7 ends. When the alignment is not completed for any image (NO in step S706), the processing returns to step S702.

When aligning the plurality of images captured by the above-described multi-lens camera, the control unit 101 can obtain the parallax amount caused by the positional deviation of the optical system 103 by calculating the amount of deviation in step S703. The control unit 101 can thereby perform the alignment through similar processing.

Figure 8:
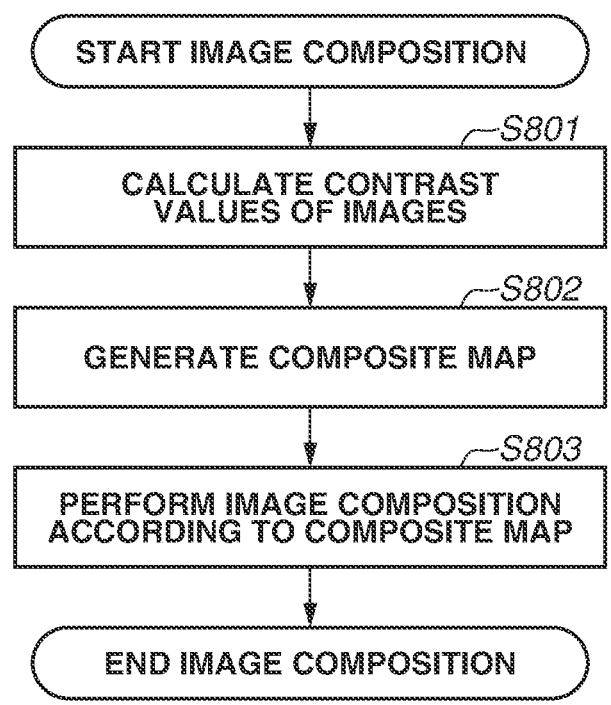
FIG. 8 is a flowchart illustrating image composition in step S503 according to an embodiment of the present invention.

FIG. 8 is a flowchart illustrating the image composition in step S503 according to the present embodiment.

In step S801, the image processing unit 107 calculates contrast values for different images (including the reference image) after the alignment. Examples of contrast value calculation methods include the following method. In the method, the image processing unit 107 calculates the luminance Y by using Formula (2) based on color signals Sr, Sg, and Sb for each pixel.

$$Y = 0.299Sr + 0.587Sg + 0.114Sb \tag{2}$$

By using a matrix L of the luminance Y of 3×3 pixels, image processing unit 107 calculates a contrast value I through a Sobel filter as represented by Formulas (3) to (5):

$$I_h = \begin{pmatrix} -1 & 0 & 1 \\ -2 & 0 & 2 \\ -1 & 0 & 1 \end{pmatrix} \cdot L. \tag{3}$$

$$I_v = \begin{pmatrix} -1 & -2 & -1 \\ 0 & 0 & 0 \\ 1 & 2 & 1 \end{pmatrix} \cdot L. \tag{4}$$

$$I = \sqrt{I_h^2 + I_v^2}. \tag{5}$$

The above-described contrast value calculation method is to be considered as illustrative. For example, an edge detection filter such as a Laplacian filter, and a band-pass filter allowing passage in a predetermined band are also applicable.

In step S802, the image processing unit 107 generates a composition map. As a composition map generation method, the image processing unit 107 compares the contrast values of pixels at the same positions in different images, and calculates the composition ratio according to the magnitudes of the contrast values. More specifically, the image processing unit 107 gives the 100% composition ratio to the pixel having the largest contrast value out of images at the same positions, and gives the 0% composition ratio to other pixels at the same positions. More specifically, the following Formula (6) is given.

$$A_m(x, y) = \max_{k=1} C_k(x, y). \tag{6}$$

In Formula (6), $C_k(x,y)$ represents the contrast value calculated in step S801, and $A_m(x,y)$ represents the composition ratio of a composition map. m denotes the m-th image out of a plurality of images with different in-focus positions. x denotes the horizontal coordinate value of the image, and y denotes the vertical coordinate value of the image.

In step S802, however, it is necessary to suitably adjust the composition ratio so that boundary portions do not become unnatural. As a result, the composition ratio of the composition map in one image is not a binary value (0% and 100%) but continuously changes.

In step S803, the image processing unit 107 subjects the images after the alignment to the composition processing by using the composition map generated in step S802, to generate a composite image. For example, the composite image can be generated by the image processing unit 107 extracting in-focus regions from each of the plurality of images with different in-focus positions and combining the in-focus regions into one image (reference image). For details of the technique, methods discussed in Japanese Patent Laid Open No. 2015-216532 or other known methods can be used.

After the image processing unit 107 generates a composite image in step S803, the composite image generated in step S803 is recorded in the built-in memory 109.

Figure 9:
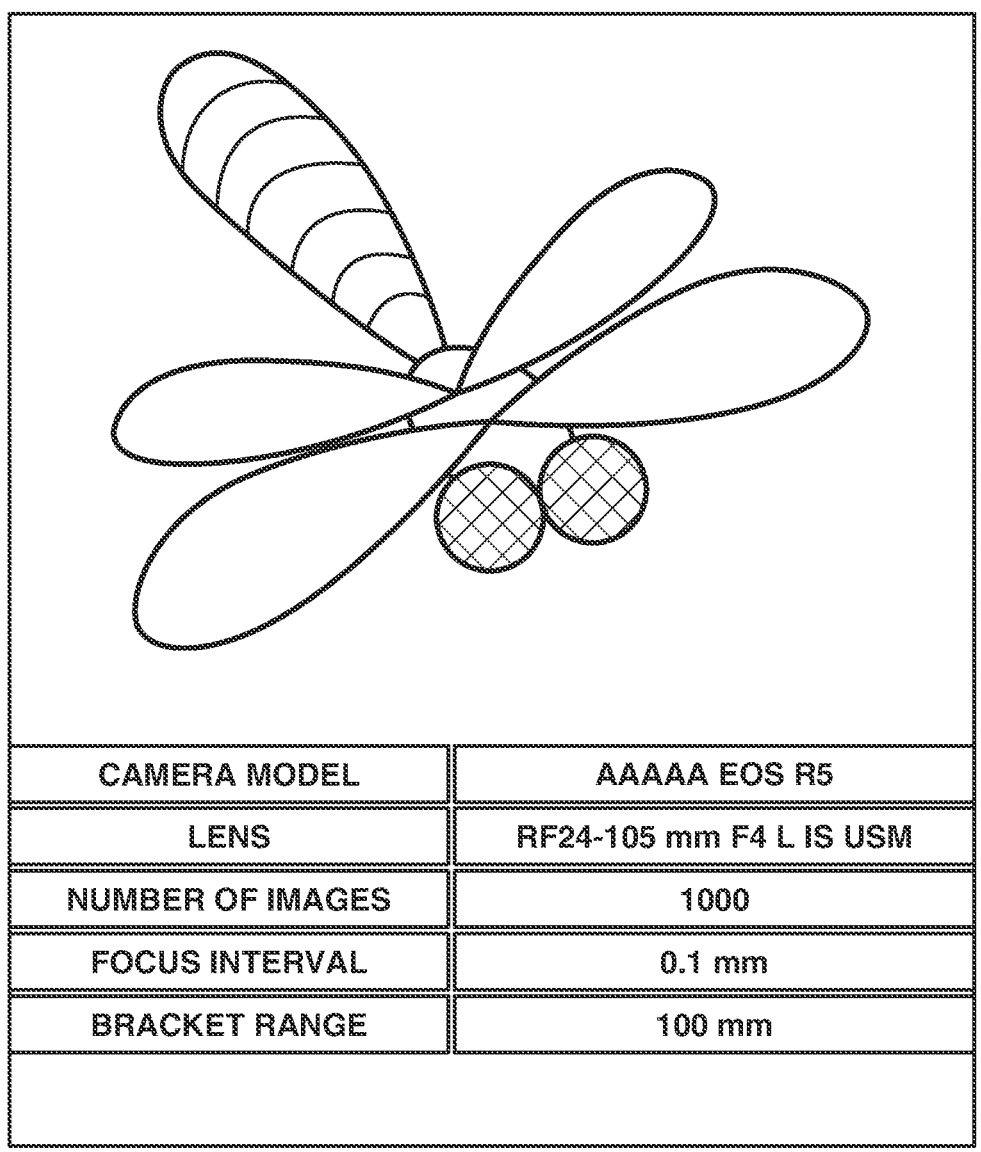
FIG. 9 illustrates composite image recording according to an embodiment of the present invention.

FIG. 9 illustrates the composite image recording according to the present embodiment. Referring to FIG. 9, the upper part displays composite image data generated by subjecting a plurality of captured images of a dragonfly (Odonata: Aeshnidae) to the depth composition processing. In addition to the image data, settings associated with the image data is also recorded. Examples of settings include a camera model, a lens type, the number of images to be used for the image composition, a focus interval for capturing images to be used for the image composition (e.g., an interval between in-focus positions), and a bracket range indicating the depth of field of the composite image. Such image data is to be used as teacher data by a learning server (described below).

The above-described depth composition technique can be used for applications in diverse fields. For example, the dragonfly (Aeshnidae) illustrated in FIG. 9 have extremely characteristic patterns not only in the compound eyes but also in the abdominal segment, and therefore is in demand to be researched in bionics, as well as in organism morphology. Such biological researches require images with a high perceived resolution. The depth composition technique enables generating images with a high perceived resolution.

However, the depth composition requires image alignment, pixel substitution, and other complicated processing, taking a long processing time to generate a composite image.

Theoretically, using a large number of images in the composite image generation enables obtaining a composite image with a high perceived resolution. However, if a sufficient perceived resolution is once obtained, there is no merit to increase the number of images to be used for the composite image generation.

Experienced users, such as researchers of organism morphology, have attempted image capturing a number of times and therefore are able to find optimum imaging settings for the living structure of the subject. Meanwhile, it is difficult for inexperienced users to determine the optimum imaging settings for the subject to be captured for the first time. Usually, a user acquires several composite images while changing the imaging settings, and stores only optimum composite images from the acquired images. However, such a method captures many unnecessary images and wastes time. For this reason, there is demanded a method in which even an inexperienced user can easily and quickly make the optimum imaging settings.

A learning apparatus that uses images captured by professional users as teacher data will now be described.

<Learning Apparatus>

The learning apparatus according to the present embodiment will now be described.

Figure 10:
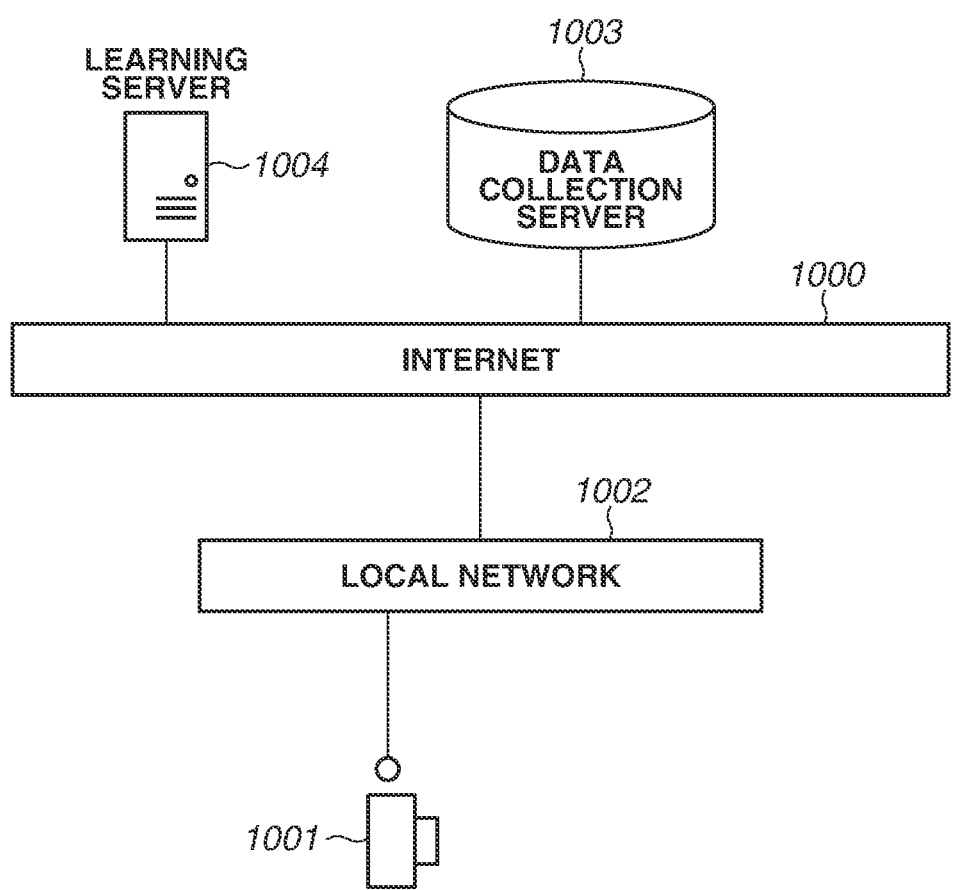
FIG. 10 is a block diagram illustrating an overall configuration of a learning apparatus according to an embodiment of the present invention.

FIG. 10 is a block diagram illustrating an entire learning system including a learning apparatus according to the present embodiment. An imaging apparatus including a CPU, such as a camera 1001, can receive data from the outside via a local network 1002. A data collection server 1003 collects a large volume of image data associated with the imaging settings illustrated in FIG. 8, for example, from a cloud. A learning server 1004 subjects the image data collected by the data collection server 1003 via the Internet 1000 to machine learning.

Figure 11:
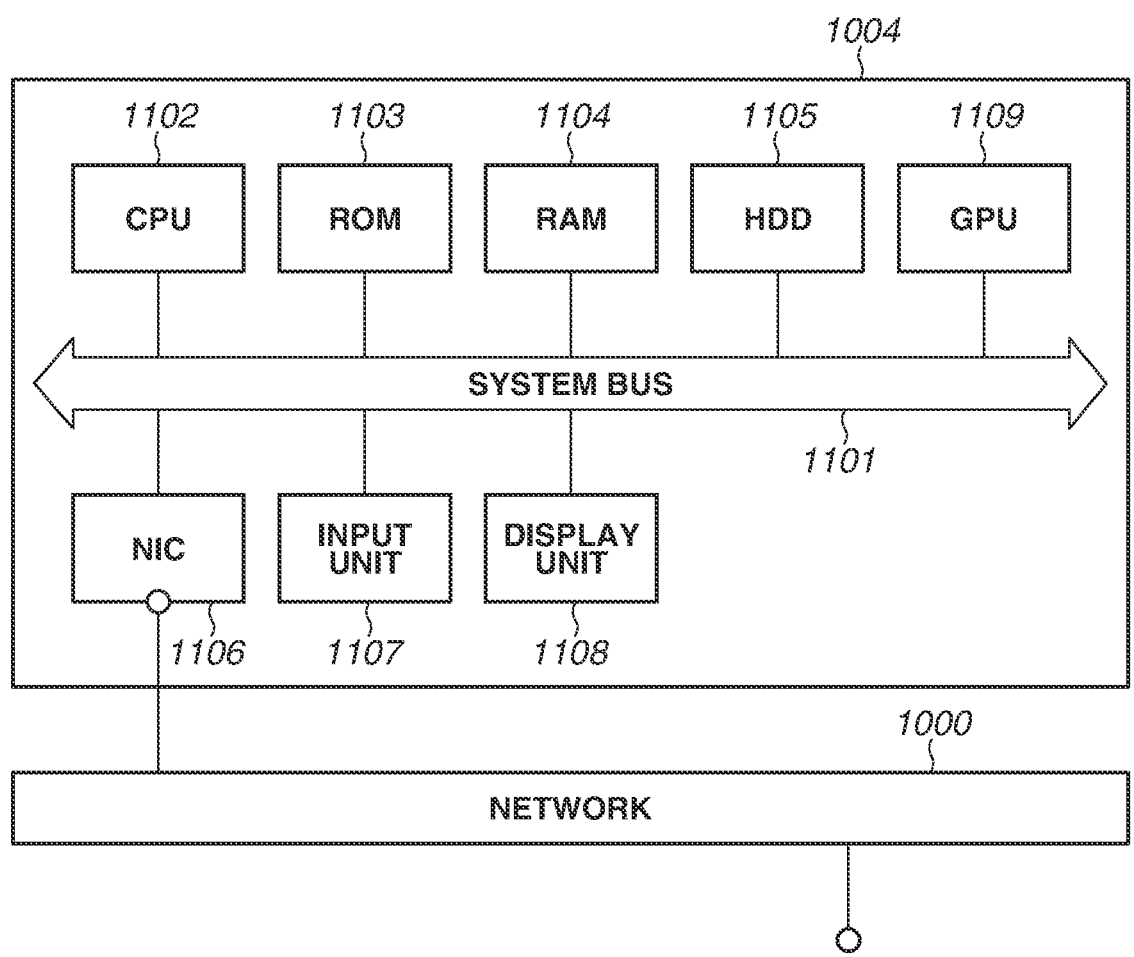
FIG. 11 is a block diagram illustrating a learning server according to an embodiment of the present invention.

FIG. 11 illustrates the learning server according to the present embodiment.

A CPU 1102 as a central processing apparatus controls each block of the learning server 1004.

The ROM 1103, a nonvolatile read only memory as a recording medium, stores operation programs for different blocks and parameters required for operations of these blocks.

A RAM 1104, a rewritable volatile memory, is used as a temporary storage area for storing data output in operations of different blocks.

A Hard Disk Drive (HDD) 1105 can store a large volume of data for the machine learning according to the present embodiment.

A network interface card (NIC) 1106 is used for the connection with the Internet 1000.

An input unit 1107, such as a keyboard, a mouse, and a touch panel, receives instructions from the user.

A display unit 1108 is an LCD or an organic EL display.

A graphics processing unit (GPU) 1109 is an operation unit specialized for machine learning. The GPU 1109 can efficiently perform operations through the parallel processing of a large amount of data. Thus, it is effective to perform processing by using the GPU 1109 when performing the learning a plurality of times by using a learning model as in the machine learning. Thus, not only the CPU 1102 but also the GPU 1109 is used for the machine learning according to the present embodiment. More specifically, when executing a learning program for the learning model, the CPU 1102 and the GPU 1109 collaborate with each other to perform operations to achieve the learning.

Figure 12:
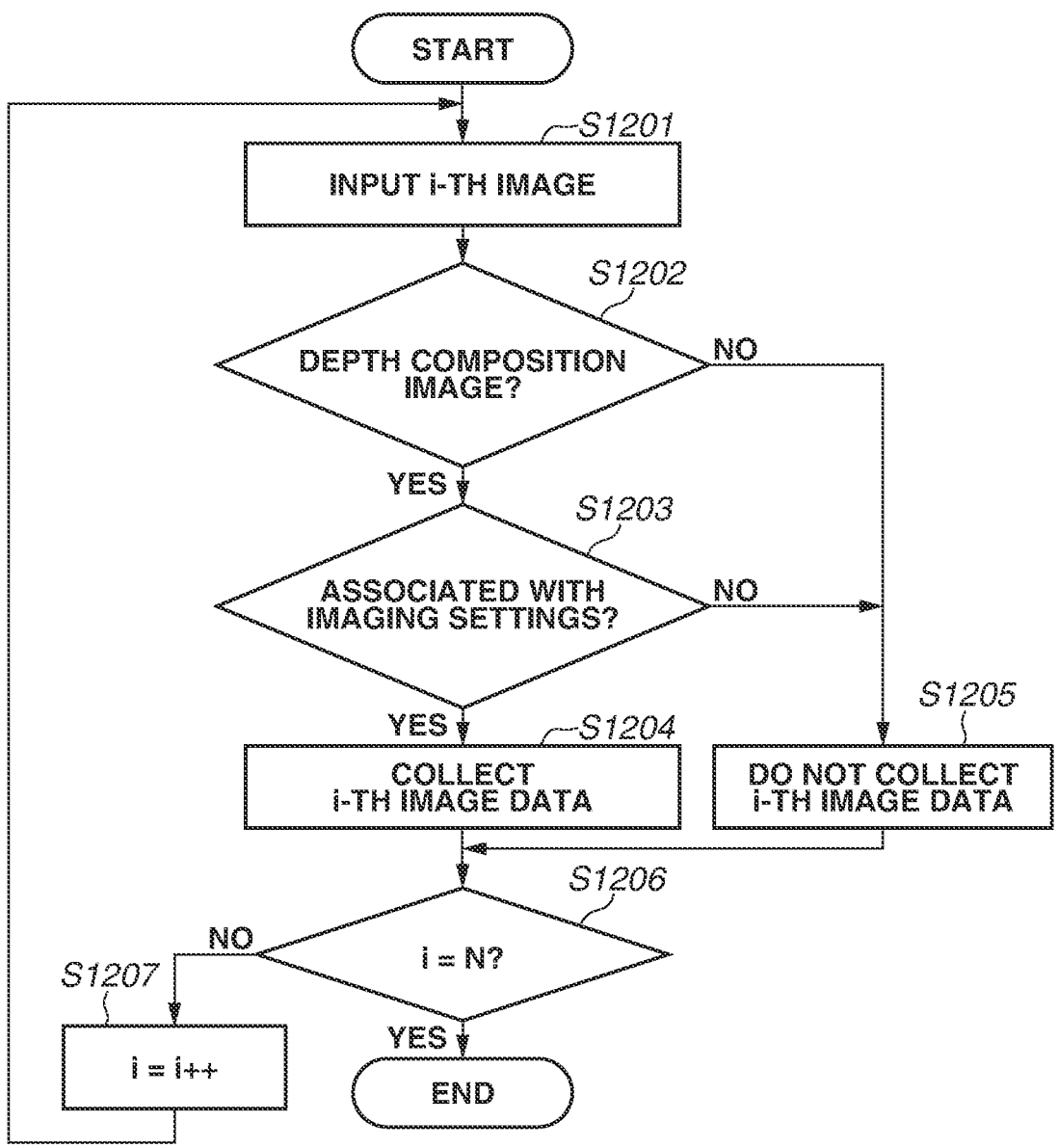
FIG. 12 is a flowchart illustrating data collection according to an embodiment of the present invention.

FIG. 12 is a flowchart illustrating data collection according to the present embodiment.

The flowchart in FIG. 12 will be described centering on processing in which the data collection server 1003 selects images to be collected from a large number of images (N images). The large number of images are, for example, images captured by professional photographers and stored on a cloud.

In step S1201, the i-th image of the N images is input to the data collection server 1003. The initial value of i is 1.

In step S1202, the data collection server 1003 determines whether the i-th image input in step S1201 is a depth composition image. When the input image is not a depth composition image (NO in step S1202), the processing proceeds to step S1205. In step S1205, the data collection server 1003 determines not to collect the i-th image.

In step S1203, the data collection server 1003 determines whether the imaging settings are associated with the i-th image input in step S1201.

When the imaging settings are associated with the i-th image (YES in step S1203), the processing proceeds to step S1204. In step S1204, the data collection server 1003 collects the i-th image data. When the imaging settings are not associated with the i-th image (NO in step S1203), the processing proceeds to step S1205. In step S1205, the control unit 101 determines not to collect the i-th image data.

The imaging settings in this case are settings as illustrated in FIG. 9. In step S1203, the data collection server 1003 can determine that the imaging settings are associated with the i-th image as long as the settings required for the depth composition are provided, even if not all of the settings illustrated in FIG. 9 are provided.

In step S1204, the data collection server 1003 can collect image data only when a predetermined condition for the imaging settings is satisfied. For example, a large number of images are required to obtain a depth composition image with a high perceived resolution. However, there may be a composite image generated by subjecting a small number of images (e.g., 10 images) to the depth composition. A composite image generated from a small number of images is not suitable for the machine learning intending for generating a composite image with a high perceived resolution. The data collection server 1003 may therefore collect only composite image data generated from the minimum number of images. Likewise, a similar limitation can be applied to the resolution of a composite image or the camera model.

In step S1206, the data collection server 1003 determines whether i=N is satisfied. When i=N is satisfied (YES in step S1206), the processing exits the flowchart. When i=N is not satisfied (NO in step S1206), the processing proceeds to step S1207. In step S1207, the control unit 101 increments i. The processing then returns to step 1201.

The data collection server 1003 can collect image data required for the machine learning through the processing in flowchart illustrated in FIG. 12.

Figure 13:
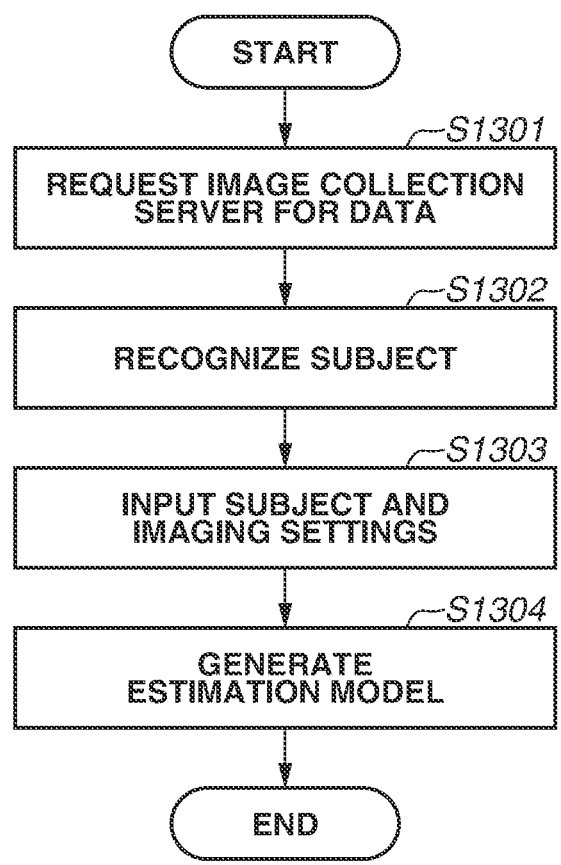
FIG. 13 is a flowchart illustrating machine learning according to an embodiment of the present invention.

FIG. 13 is a flowchart illustrating the machine learning according to the present embodiment. The flowchart in FIG. 13 illustrates processing in which the learning server 1004 performs the machine learning by using the image data collected by the data collection server 1003, as teacher data.

In step S1301, the learning server 1004 requests the data collection server 1003 for data via the NIC 1106. When the learning server 1004 requests the data collection server 1003 for data, the data collection server 1003 transmits the image data associated with all of the imaging settings collected in step S1204 to the learning server 1004.

Figure 14:
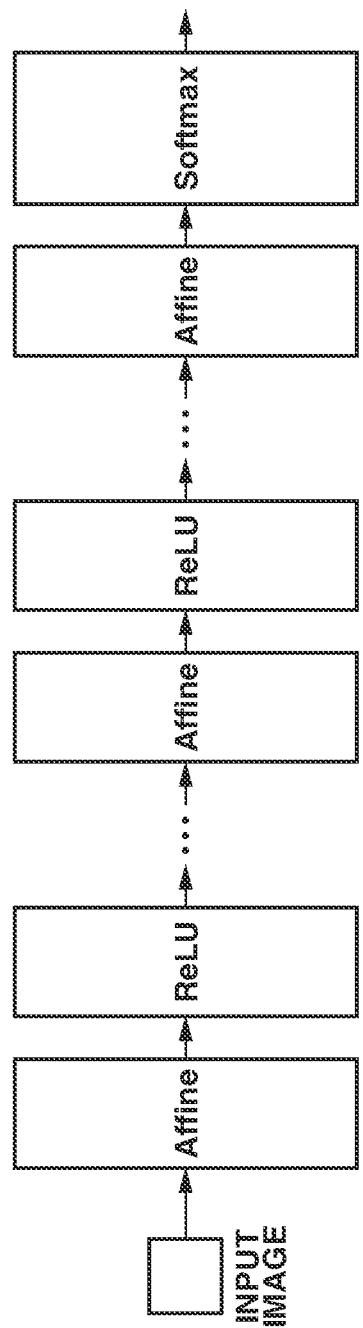
FIG. 14 illustrates an affine layer according to an embodiment of the present invention.

In step S1302, the CPU 1102 and the GPU 1109 subjects the image data transmitted from the data collection server 1003 to the subject recognition. The CPU 1102 and GPU 1109 may, for example, operate as recognition means for recognizing a subject as an imaging target. For example, the subject recognition performed in step S1302 means recognizing the image data of the dragonfly (Aeshnidae) illustrated in FIG. 9 as a dragonfly. FIG. 14 illustrates an affine layer according to the present embodiment. In step S1302, the CPU 1102 and the GPU 1109 can perform, as an example, the subject recognition by using the neural network illustrated in FIG. 14.

For example, when subjecting images of Insecta to the subject recognition, the CPU 1102 and the GPU 1109 may recognize a specific feature without identifying the insect type. For example, if the CPU 1102 and the GPU 1109 can recognize the specific pattern of the compound eye in a depth composite image having a bracket range of the portion of the compound eye of Insecta, the CPU 1102 and the GPU 1109 need to record this pattern as a result of the subject recognition.

In step S1303, the CPU 1102 and the GPU 1109 perform the machine learning for the estimation model generation, by using as teacher data the result of the subject recognition on the image data in step S1302 and the settings in image capturing for the same image data.

As described above, a sufficient number of captured images are required to obtain high perceived resolutions of subjects of different types. To prevent useless image capturing, a professional photographer performs image capturing while making trials and errors. More specifically, to obtain a high perceived resolution, the photographer performs image capturing for the depth composition based on the optimum number (e.g., a minimum number) of captured images. The optimum number of captured images depends on the type of each subject. Assume an example case of generating images of the compound eye of Insecta with a high perceived resolution through the depth composition. The structure of the compound eye of the above-described dragonfly (Aeshnidae) is more complicated than that of a fly (Diptera: Muscomorpha), and therefore the required number of captured images for the dragonfly is larger than that for the fly. This means that the optimum number of captured images required for the depth composition depends on the type of each subject.

Examples of specific algorithm of the machine learning include the most neighborhood method, naive Bayes approach, decision tree, and support vector machine. Examples of algorithms also include deep learning for generating by itself the feature quantity for learning and binding weighting coefficients by using a neural network. Any available algorithm of the above-described algorithms can be applied to the present embodiment as required.

Figure 15:
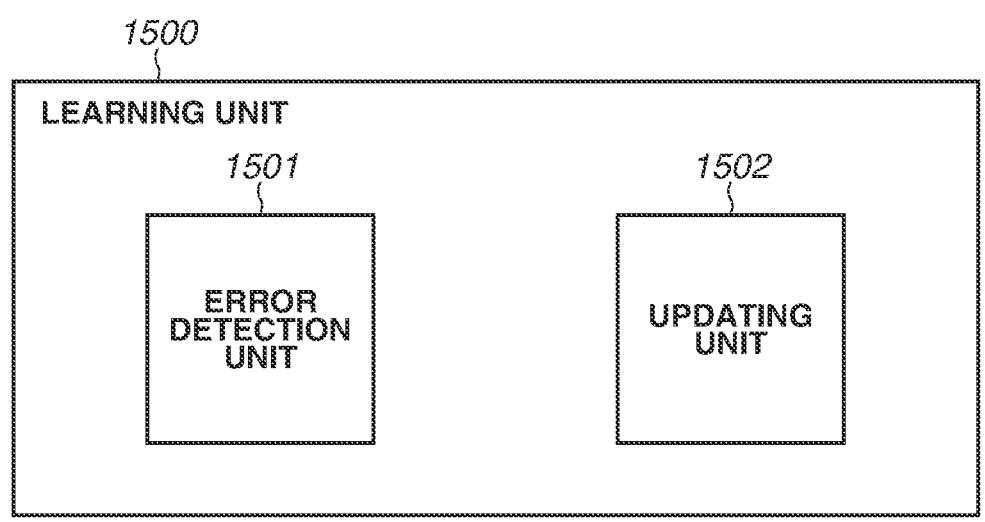
FIG. 15 illustrates a learning unit according to an embodiment of the present invention.

FIG. 15 illustrates a learning unit according to the present embodiment. The function of a learning unit 1500 is implemented by the CPU 1102 and the GPU 1109, and operations can be performed only by the CPU 1102 or the GPU 1109.

The learning unit 1500 can include an error detection unit 1501 and an updating unit 1502. The error detection unit 1501 obtains an error between the teacher data and the output data that is output from the output layer of the neural network based on the input data input to the input layer. The error detection unit 1501 can calculate the error between the output data from the neural network and the teacher data by using a loss function.

Based on the error obtained by the error detection unit 1501, the updating unit 1502 updates the binding weighting coefficients between nodes of the neural network so that the error decreases. The updating unit 1502 updates the binding weighting coefficients by using, for example, Error Back Propagation. Error Back Propagation is a technique for adjusting the binding weighting coefficients between nodes of each neural network so that the error decreases.

The machine learning according to the present embodiment can use only the position region of an image as teacher data. For example, in a case where only the portion of the compound eye falls within the bracket range in the composite image of the insect illustrated in FIG. 9, the CPU 1102 determines that the depth composition target range is the compound eye based on the contrast, and uses only the portion of the compound eye as teacher data. Alternatively, also for a composite image with which the entire insect falls within the bracket range, the user also selects only the portion of the compound eye via the input unit 1107, and the CPU 1102 and the GPU 1109 recognize the portion selected by the user, as teacher data.

The use of the estimation model generated in step S1304 will now be described.

Figure 16:
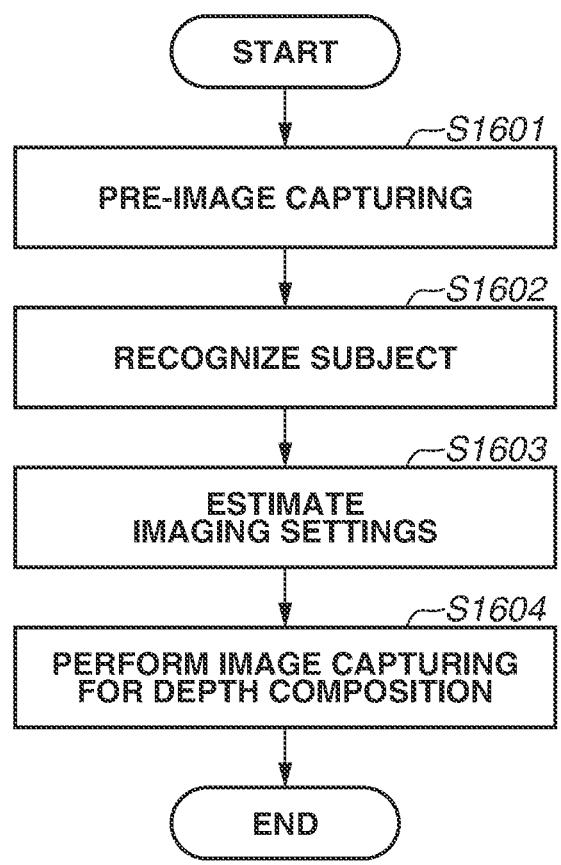
FIG. 16 is a flowchart illustrating a use of an estimation model according to an embodiment of the present invention.

FIG. 16 is a flowchart illustrating the use of the estimation model according to the present embodiment.

When a learned estimation model exists in the learning server 1004 in the system illustrated in FIG. 10, the camera 1001 can exchange information with the learning server 1004 via the Internet 1000 and the local network 1002. The user of the camera 1001 makes an attempt to acquire a composite image of a certain subject with a high perceived resolution by using the depth composition function.

In step S1601, the camera 1001 subjects a subject to pre-image capturing. In the pre-image capturing, the camera 1001 captures images for the subject recognition processing to be performed in step S1602.

In step S1602, the CPU 1102 and the GPU 1109 subject the images captured in the pre-image capturing in step S1601 to the subject recognition processing. The result of the subject recognition is used as input data in the following step S1603.

Figure 17:
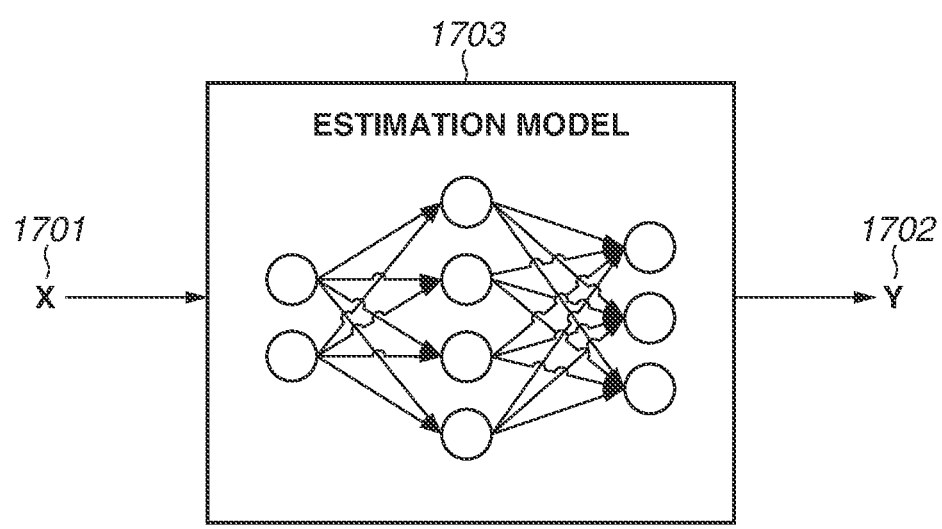
FIG. 17 illustrates a use of the estimation model according to an embodiment of the present invention.

FIG. 17 illustrates the use of the estimation model according to the present embodiment. In step S1603, the CPU 1102 and the GPU 1109 input input data 1701 (X) to an estimation model 1703 and then acquire output data 1702 (Y). The estimation model 1703 includes an input layer, an intermediate layer, and an output layer formed of a large number of neurons. The number of the intermediate layer is not limited to one. The input data 1701 is, for example, the type of the subject. The output data 1702 includes imaging settings for the depth composition, such as the number of captured images and the intervals between in-focus positions.

The type of the output data 1702 relates to the imaging settings associated with the image data to be used as teacher data. For example, if the imaging settings do not include information about the "lens type" or if the information is not used as teacher data, the output data 1702 cannot include the information about the "lens type".

In step S1604, the camera 1001 makes settings for image capturing based on the output data acquired in step S1603, and then performs image capturing for the depth composition. For example, the control unit 101 performs processing (e.g., operates as setting means) for making imaging settings for the subject based on output data acquired in step S1603 which output data is obtained by using the generated model (e.g., machine-learned estimation model). The output data may be image settings provided by the model generated by model generating means of the learning server 1004 using teacher data (e.g., from the data collection server 1003) including a subject and a composite image generated from a plurality of images captured based on settings predetermined for the subject. Imaging means, such as imaging unit 104 under the control of the control unit 101, can then perform image capturing based on the settings made. The control unit 101 (e.g., operating as composition means) may then perform composition processing on the images obtained in image capturing in S1604. For example, the control unit 101 may extract in-focus regions of the images obtained and combine the extracted in-focus regions into one image to generate a composite image by performing composition processing as discussed above with reference to FIG. 8.

The present embodiment allows inexperienced users to quickly make imaging settings suitable for the characteristics of the subject.

Although, in the embodiment, the control unit 101 performs processing by using the settings for the depth composition and a machine-learned estimation model, the control unit 101 can also perform rule-based processing based on a look-up table (LUT). In such a case, the control unit 101 generates a relation between, for example, the input and the output data as a LUT in advance. The generated LUT can be stored in the built-in ROM of the camera 1001. When making settings for the depth composition, the control unit 101 can acquire the output data with reference to the stored LUT. In other words, the LUT performs processing in collaboration with the CPU 1102 or the GPU 1109 as a program for performing processing equivalent to the above-described processing in step S1603. For example, the control unit 101 may make imaging settings for the subject by using image settings in the LUT which have been provided in advance by the model generated by model generating means of the learning server 1004.

OTHER EMBODIMENTS

The present invention can also be achieved when a program for implementing at least one of the functions according to the above-described embodiment is supplied to a system or apparatus via a network or storage medium, and a computer of the system or apparatus reads and executes the program. The computer can have one or a plurality of processors or circuits, and include a network of a plurality of separated computers or a plurality of separated processors or circuits in order to read and execute computer-executable instructions.

A processor or circuit may include a CPU, an MPU, GPU, ASIC, and field programmable gateway (FPGA). A processor or circuit may also include a digital signal processor (DSP), data flow processor (DFP), or neural processing unit (NPU). In the present embodiment, a configuration of a leaning apparatus independent of the imaging apparatus has been discussed. However, the configuration is not limited thereto. For example, the configuration can have an image processing apparatus including a learning apparatus inside and independent from the imaging apparatus. Alternatively, the imaging apparatus itself can incorporate the above-described learning apparatus or the image processing apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2022-069479, filed Apr. 20, 2022, which is hereby incorporated by reference herein in its entirety.

What is claimed is:

1. A learning apparatus comprising:
one or more processors; and
a memory storing instructions which, when executed by the one or more processors, causes an apparatus to function as:
a model generating unit configured to generate a model that outputs imaging settings that are used to set values in an imaging apparatus and which are used by the imaging apparatus in capturing one or more images in order to generate a composite image of a type of subject being captured by the imaging apparatus, the model is generated through machine learning that uses teacher data including the type of subject to be imaged and a composite image generated, from a plurality of images are each captured at in-focus positions different in an optical axis direction and extracting in-focus regions from within each of the plurality of images,
wherein the output settings include at least the in-focus positions for the imaging apparatus to capture a composite image of a type of subject to be imaged.

2. The learning apparatus according to claim 1, wherein the settings include at least one of a number of images and an interval between in-focus positions.

3. The learning apparatus according to claim 2, wherein the number of images is a minimum number of images that satisfies a predetermined perceived resolution of the composite image.

4. An image processing apparatus comprising:
one or more processors; and
a memory storing instructions which, when executed by the one or more processors, causes an apparatus to function as:
a model generating unit configured to generate a model that outputs imaging settings that are used to set values in an imaging apparatus and which are used by the imaging apparatus in capturing one or more images in order to generate a composite image of a type of subject being captured by the imaging apparatus, the model is generated through machine learning that uses teacher data including the type of subject to be imaged and a composite image generated from a plurality of images each captured at in-focus positions different in an optical axis direction and by extracting in-focus regions from the plurality of images; and a setting unit configured to use the output imaging settings for the imaging apparatus to capture a composite image of a type of subject to be imaged wherein the settings include at least the in-focus positions.

5. The image processing apparatus according to claim 4, further comprising a recognition unit configured to recognize a subject as an imaging target, wherein the setting unit is configured to generate the settings based on a recognition result of the recognition unit.

6. The image processing apparatus according to claim 4, wherein the settings include at least one of a number of images and an interval between in-focus positions.

7. The image processing apparatus according to claim 6, wherein the number of images is a minimum number of images that satisfies a predetermined perceived resolution of the composite image.

8. An imaging apparatus comprising:
one or more processors; and
a memory storing instructions which, when executed by the one or more processors, causes an apparatus to function as:
a model generating unit configured to generate a model that outputs imaging settings that are used to set values in the imaging apparatus and which are used by the imaging apparatus in capturing one or more images in order to generate a composite image of a type of subject being captured by the imaging apparatus, the model is generated through machine learning that uses teacher data including the type of subject to be imaged and a composite image generated from a plurality of images each captured at in-focus positions different in an optical axis direction and by extracting in-focus regions from the plurality of images; and
a setting unit configured to make the imaging settings for the subject by using the model generating unit; and
an imaging unit configured to perform image capturing based on the settings made by the setting unit,
wherein the settings include at least the in-focus positions for the imaging apparatus to capture a composite image of a type of subject to be imaged.

9. The imaging apparatus according to claim 8, further comprising a composition unit configured to perform composition processing on the images obtained in the image capturing by the imaging unit.

10. The imaging apparatus according to claim 9, wherein the composition unit is configured to extract in-focus regions of the images obtained in the image capturing by the imaging unit and to perform the composition processing.

11. The imaging apparatus according to claim 8, further comprising a recognition unit configured to recognize a subject as an imaging target, wherein the setting unit is configured to generate the settings based on a result of a recognition by the recognition unit.

12. The imaging apparatus according to claim 8, wherein the settings include at least one of a number of images and an interval between in-focus positions.

13. The imaging apparatus according to claim 12, wherein the number of images is a minimum number of images that satisfies a predetermined perceived resolution of the composite image.

14. A method comprising:
generating a model that outputs imaging settings that are used to set values in an imaging apparatus and which are used by the imaging apparatus in capturing one or more images in order to generate a composite image of a type of subject being captured by the imaging apparatus, the model is generated through machine learning that uses teacher data including the type of subject to be imaged and a composite image generated, from a plurality of images are each captured at in-focus positions different in an optical axis direction and extracting in-focus regions from within each of the plurality of images,
wherein the output settings include at least the in-focus positions for the imaging apparatus to capture a composite image of a type of subject to be imaged.

15. The method according to claim 14, wherein the settings include at least one of a number of images and an interval between in-focus positions.

16. The method according to claim 15, wherein the number of images is a minimum number of images that satisfies a predetermined perceived resolution of the composite image.

17. A non-transitory computer-readable storage medium which stores a program for causing a computer of an apparatus to execute a method, the method comprising:
generating a model that outputs imaging settings that are used to set values in an imaging apparatus and which are used by the imaging apparatus in capturing one or more images in order to generate a composite image of a type of subject being captured by the imaging apparatus, the model is generated through machine learning that uses teacher data including the type of subject to be imaged and a composite image generated, from a plurality of images are each captured at in-focus positions different in an optical axis direction and extracting in-focus regions from within each of the plurality of images,
wherein the output settings include at least the in-focus positions for the imaging apparatus to capture a composite image of a type of subject to be imaged.

18. An imaging apparatus comprising:
one or more processors; and
a memory storing instructions which, when executed by the one or more processors, causes an apparatus to function as:
a setting unit configured to make imaging settings in the imaging apparatus for a type of subject to be imaged by using image settings output from a model that outputs imaging settings that are used in making the imaging settings in the imaging apparatus, wherein the model is generated through machine learning that uses teacher data including the type of subject to be imaged and a composite image generated, from a plurality of images are each captured at in-focus positions different in an optical axis direction and extracting in-focus regions from within each of the plurality of images; and
an imaging unit configured to perform image capturing based on the output settings made by the setting unit,
wherein the output settings include at least the in-focus positions for the imaging apparatus to capture a composite image of a type of subject to be imaged.

19. The imaging apparatus according to claim 18, further comprising a composition unit configured to perform composition processing on the images obtained in the image capturing by the imaging unit.

20. The imaging apparatus according to claim 19, wherein the composition unit is configured to extract in-focus regions of the images obtained in the image capturing by the imaging unit and to perform the composition processing.

21. The imaging apparatus according to claim 18, further comprising a recognition unit configured to recognize a subject as an imaging target, wherein the setting unit is configured to generate the settings based on a result of a recognition by the recognition unit.

22. The imaging apparatus according to claim 18, wherein the settings include at least one of a number of images and an interval between in-focus positions.

23. The imaging apparatus according to claim 22, wherein the number of images is a minimum number of images that satisfies a predetermined perceived resolution of the composite image.

* * * * *